(12) United States Patent
Nelson et al.

(10) Patent No.: US 7,823,070 B2
(45) Date of Patent: Oct. 26, 2010

(54) METHODS AND SYSTEMS FOR EXTENDING EXISTING USER INTERFACES

(75) Inventors: Lester D. Nelson, Santa Clara, CA (US); Laurent Denoue, Palo Alto, CA (US); Jonathan Helfman, Half Moon Bay, CA (US); Elizabeth F. Churchill, San Francisco, CA (US); Scott Carter, El Cerrito, CA (US); Paul Murphy, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1147 days.

(21) Appl. No.: 10/739,186

(22) Filed: Dec. 19, 2003

(65) Prior Publication Data

US 2005/0138614 A1 Jun. 23, 2005

(51) Int. Cl.
G06F 3/00 (2006.01)

(52) U.S. Cl. .............. 715/747; 715/744; 715/745; 715/746; 715/825; 715/861

(58) Field of Classification Search ......... 715/744–747, 715/825, 861
See application file for complete search history.

(56) References Cited

U.S. PATENT DOCUMENTS

| | | | | |
|---|---|---|---|---|
| 6,061,057 A * | 5/2000 | Knowlton et al. | ........... | 715/744 |
| 6,185,590 B1 * | 2/2001 | Klein | ........... | 715/526 |
| 6,292,824 B1 * | 9/2001 | Siksa | ........... | 709/202 |
| 6,562,076 B2 * | 5/2003 | Edwards et al. | ........... | 715/515 |
| 6,698,016 B1 * | 2/2004 | Ghizzoni | ........... | 717/162 |
| 6,842,891 B2 * | 1/2005 | Zhang et al. | ........... | 717/101 |
| 6,898,788 B2 * | 5/2005 | Kosaka et al. | ........... | 717/162 |
| 6,993,362 B1 * | 1/2006 | Aberg | ........... | 455/566 |
| 7,058,940 B2 * | 6/2006 | Calahan | ........... | 717/167 |
| 2002/0054087 A1 * | 5/2002 | Noll et al. | ........... | 345/744 |
| 2003/0067483 A1 * | 4/2003 | Harris | ........... | 345/745 |
| 2003/0103074 A1 | 6/2003 | Jasinschi | ........... | 715/716 |
| 2004/0056890 A1 * | 3/2004 | Hao et al. | ........... | 345/744 |
| 2004/0261069 A1 * | 12/2004 | Verbeke et al. | ........... | 717/166 |
| 2005/0268279 A1 * | 12/2005 | Paulsen et al. | ........... | 717/110 |

OTHER PUBLICATIONS

Bickmore, T.W. et al., "Digestor: Device-Independent Access to the World Wide Web." *Proceedings for the Sixth Int'l World Wide Web Conference 1997*, pp. 655-663.
Bier, E.A. et al., "A Taxonomy of See-Through Tools" *Proceedings of the SIGCHI Conference on Human Factors in Computing Systems*, Apr. 1994.
Bos, B. "Cascading Style Sheets Home Page" www.w3.org/Style/CSS/, *World Wide Web Consortium*, May 2003.

(Continued)

*Primary Examiner*—William L Bashore
*Assistant Examiner*—Ashraf Zahr
(74) *Attorney, Agent, or Firm*—Sughrue Mion, PLLC

(57) ABSTRACT

Methods and systems that can be used to dynamically restructure user interfaces into a set of communicating processes. The methods and systems update new and wrapped legacy user interface components for repurposing of user interfaces. The methods and systems provide for changing one or more of at least an appearance, a behavior, and a state or condition of the user interfaces.

13 Claims, 9 Drawing Sheets

INTERFACE RESTRUCTURING SYSTEM (1000)

OTHER PUBLICATIONS

Churchill, E.F. "The Plasma Poster Network" *FXPAL Technical Report FXPALTR 03-022* 2003.

eNode, Inc., "Model-View-Controller Pattern" www.enode.com/x/markup/tutorial/mvc.html 2002.

Howard, D. "Introducing the Windows Media Player" *SDK Microsoft Corporation* Sep. 2002 msdn.microsoft.com/library/default.asp?url=/library/enus/dnwt/html/WMPlayer_9_SDK_Intro.asp.

iMarkup Solutions, "Annotation Functions" www.imarkup.com/products/annotate_page.asp, 2002.

* cited by examiner

METHODS AND SYSTEMS FOR EXTENDING EXISTING USER INTERFACES

BACKGROUND OF THE INVENTION

1. Field of Invention

This invention generally relates to restructuring user interface components of computer applications.

2. Description of Related Art

Computer application user interface components, such as, for example, Web browsers, have become entrenched in computer use practices. For example, Web content designers will at times depend on the many features of existing browsers, such as for example, the content types supported by a browser, underlying data representations for specifying the display properties, e.g., the tags and parameters, and the like.

With the acceleration of technological development, system software designers are reaching the point where system software and their user interfaces become to some degree outdated 'legacy systems' as soon as they are released.

SUMMARY OF THE INVENTION

The dependence on the features of existing browsers becomes a problem if software designers want to create new applications that retain some or all of the representational abilities of the older software, but have new interaction requirements, such as, for example, defining new ways links get followed.

Maintaining, extending, overriding, and/or adapting system software and their user interfaces while preserving the features that software developers depend on is advantageous.

This invention provides methods and systems that dynamically restructure user interfaces into a set of communicating processes.

This invention separably provides methods and systems that dynamically restructure and/or update new and wrapped legacy user interface components to allow for repurposing of user interfaces.

This invention separably provides methods and systems that provide for changing the appearance, behavior, and state/condition of user interfaces.

This invention separably provides methods and systems that connect or link a proposed state/condition change of the user interface to other processes to enable these processes to override their actions in updating themselves to the new proposed state/condition.

In various exemplary embodiments, the systems and methods according to this invention restructure a computer application user interface component by dynamically injecting a functionality into a first layer in the user interface component, communicating an event to a controlling process used in at least the first layer, and performing an action in the first layer based on the event. In various exemplary embodiments, the controlling process restructures at least one of an appearance, a functionality and a condition of at least the first layer.

In various exemplary embodiments, the systems and methods according to this invention further include indicating to a second layer, a change of the condition of the at least first layer. In various exemplary embodiments, an action is performed in the second layer in response to the change of the condition of the at least first layer. In various exemplary embodiments, the action performed in the second layer is the same as the action performed in the first layer. In various exemplary embodiments, the first layer is a content layer. In various exemplary embodiments, the second layer is a branding layer.

BRIEF DESCRIPTION OF THE DRAWINGS

Various exemplary embodiments of the systems and methods of this invention will be described in detail below, with reference to the following figures, in which.

DETAILED DESCRIPTION OF PREFERRED EMBODIMENTS

Figure 1:
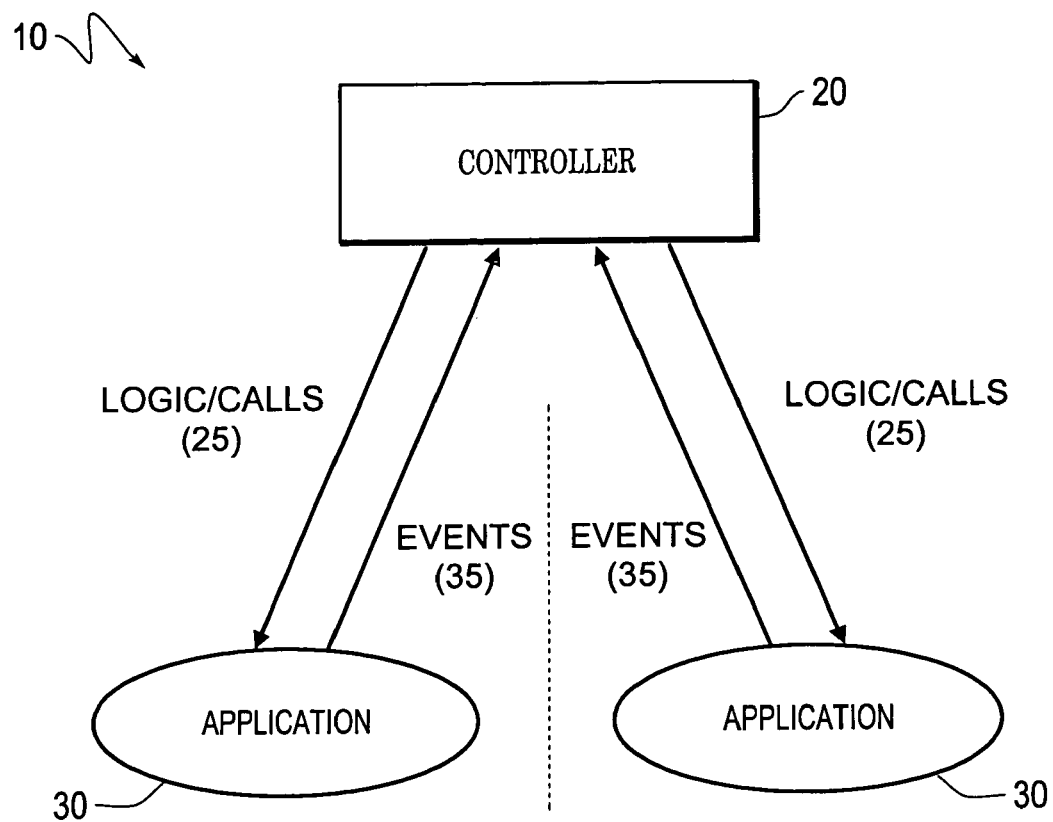
FIG. 1 is a high-level schematic representation of one exemplary embodiment of a method and system for restructuring a user interface component of a computer application according to this invention.

FIG. 1 is a high-level schematic representation of one exemplary embodiment of the implementation of a method and system for restructuring a user interface component of a computer application according to this invention.

In various exemplary embodiments of the systems and methods according to this invention, a system 10 uses at least a controller 20 to inject one or more additional programming logic/programming calls 25 into one or more computer applications 30. In various exemplary embodiments, the one or more computer applications 30 include any known or future developed computer applications, such as, for example, internet web browsers, e-mail applications, document productivity applications, multi-media processing and/or presentation applications, information processing applications and the like.

In various exemplary embodiments, programming logic/programming calls 25 allow the controller 20 to capture one or more events 35 from the one or more computer applications 30. Further, in various exemplary embodiments, the captured events 35 inject additional programming logic/programming calls 25 or invoke other processing commands in the controller 20, in the modified application 30, in some other application (not shown) modified by the controller or a similar controller (not shown) as specified according to this invention, or in another unrelated application (not shown).

Figure 2:
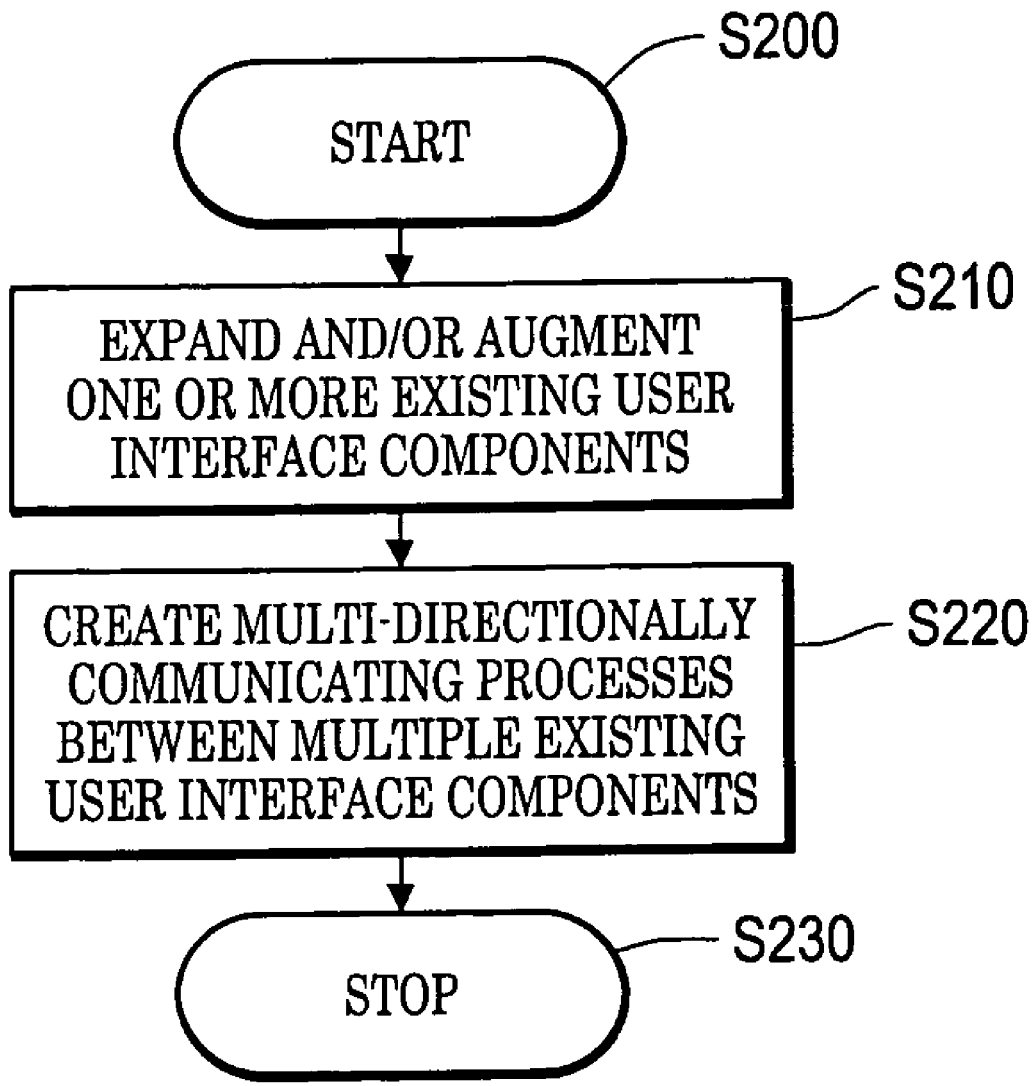
FIG. 2 is a flowchart outlining one exemplary embodiment of a method for restructuring a user interface component of a computer application according to this invention.

FIG. 2 is a flowchart outlining one exemplary embodiment of a method for restructuring a user interface component of a computer application according to this invention. As shown in FIG. 2, the method starts in step S200, and continues to step S210, where one or more existing user interface components, such as, for example, a viewer, are expanded/augmented. In various exemplary embodiments, the one or more existing user interface components are expanded/augmented by adding, removing, and/or modifying the code of the user interface components. In various alternative exemplary embodiments, the one or more existing user interface components are expanded/augmented by adding, removing, and/or modifying components of the content displayed in the user interface, i.e., by instrumenting content in the user interface.

Methods for code expansion/augmentation include but are not limited to manipulation within the interface of scripting languages, macros, parameters and configuration information, and invocation of application programming interfaces for code modification such as document object model manipulation. Operations by the expanded/augmented code include, but are not limited to, adding or modifying communication of events occurring within the first layer to the other layers, redefinition of existing data structures within the first layer, incorporation of new data structures within the first layer, removal of data structures within the first layer, redefinition of existing functionality within the first layer, incorporation of new functionality within the first layer, and removal of functionality within the first layer.

In various exemplary embodiments, these expansions/augmentations thereby create a Multi-Directionally communicating processes between multiple existing user interface components (S220). The operation of the process shown in FIG. 2 terminates at step s230.

As discussed above, the one or more user interface components are expanded and/or augmented by instrumenting content in the user interface. Instrumenting content may include instrumenting at least a first layer, such as, for example, a content layer, using one or more instrumentation methods or techniques. Instrumentation methods or techniques are well known in the art.

In various exemplary embodiments, instrumenting content is performed by accessing an underlying data model of the content being displayed. In various exemplary embodiments, the underlying data model of the content being displayed includes a Document Object Model.

In various exemplary embodiments, instrumenting content is performed by embedding the user interface into an environment that provides a means to trap or lock in all input events. In various exemplary embodiments, embedding the user interface is performed using well known software code, such as, for example, including ActiveX controls in a Visual Basic form, including Web Services in a C# form, trapping X Window event streams and the like.

As discussed above, in step S220, multi-directionally communicating processes are created by inserting or adding application level repurposing communication protocols into the existing user interface components. In various exemplary embodiments, the multi-directionally communicating processes, such as, for example, bi-directionally communicating processes, redefine the existing or original user interface. In various exemplary embodiments, the insertion/addition of application level communication protocols into a first layer, for example, a content layer, redefines at least one of a presentation appearance and a behavior of the content layer.

In various exemplary embodiments, when the user interface is updated with content, software code that is appropriate to the user interface communication model is introduced into the user interface. In various exemplary embodiments, software code includes, for example, event stream data, HTTP/HTML for Web-based applications, and the like.

In various exemplary embodiments, the software code re-specifies one or more user interface events in the user interface component with the following information. For example, in various exemplary embodiments, the command being invoked is specified at the application level, for example, application level 'Pause' vs. device level 'Mouse Down'. In various further exemplary embodiments, the software code re-specifies one or more user interface events such as, for example, attributes related to that command, such as, for example, meta-data, parameters, qualifiers, properties specified by name-value pairs and the like. In additional exemplary embodiments, the software code re-specifies a callback method, such as, for example, code designation in the embedding context or in some other context accessible from the embedding context. In yet further, exemplary embodiments, the software code re-specifies one or more user interface events such as, for example, any combination or the omission of any of the above information.

Other repurposing protocol approaches, such as form example, XML documents, are applicable with the methods and systems of this invention.

Whenever user or system actions trigger the instrumented user interface elements, code in the embedding context applies processing rules that redefine a condition/state and or behavior of the event processing. In various exemplary embodiments, the redefined event processing includes various actions or commands, such as, for example, ignore actions, process actions with the original user interface, perform new actions in the embedding context, pass information to some other context for processing, and the like.

Figure 3:
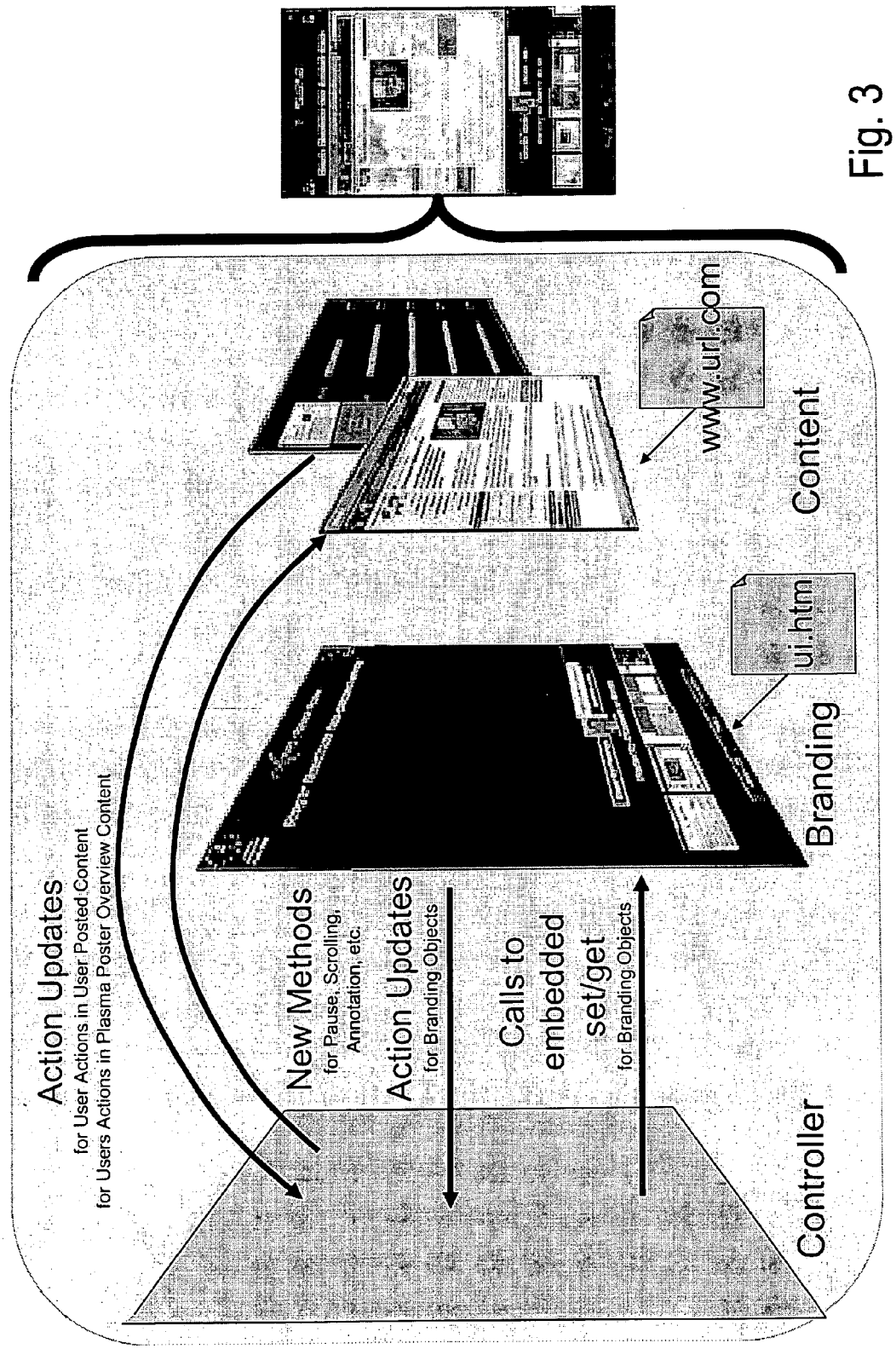
FIGS. 3-7 are a high-level schematic representation of one exemplary embodiment of a method and system for restructuring a user interface component of a computer application according to this invention.

FIGS. 3-7 are a high-level schematic representation of one exemplary embodiment of a method and system for restructuring a user interface component of a computer application according to this invention. As shown in FIG. 3, restructuring of the user interface components allows information to flow between components, which might not have previously been able to directly communicate with each other. In this way, actions may be delegated to components whose capabilities and configurations make them a necessary or more appropriate choice to process redefined display operations.

Figure 4:
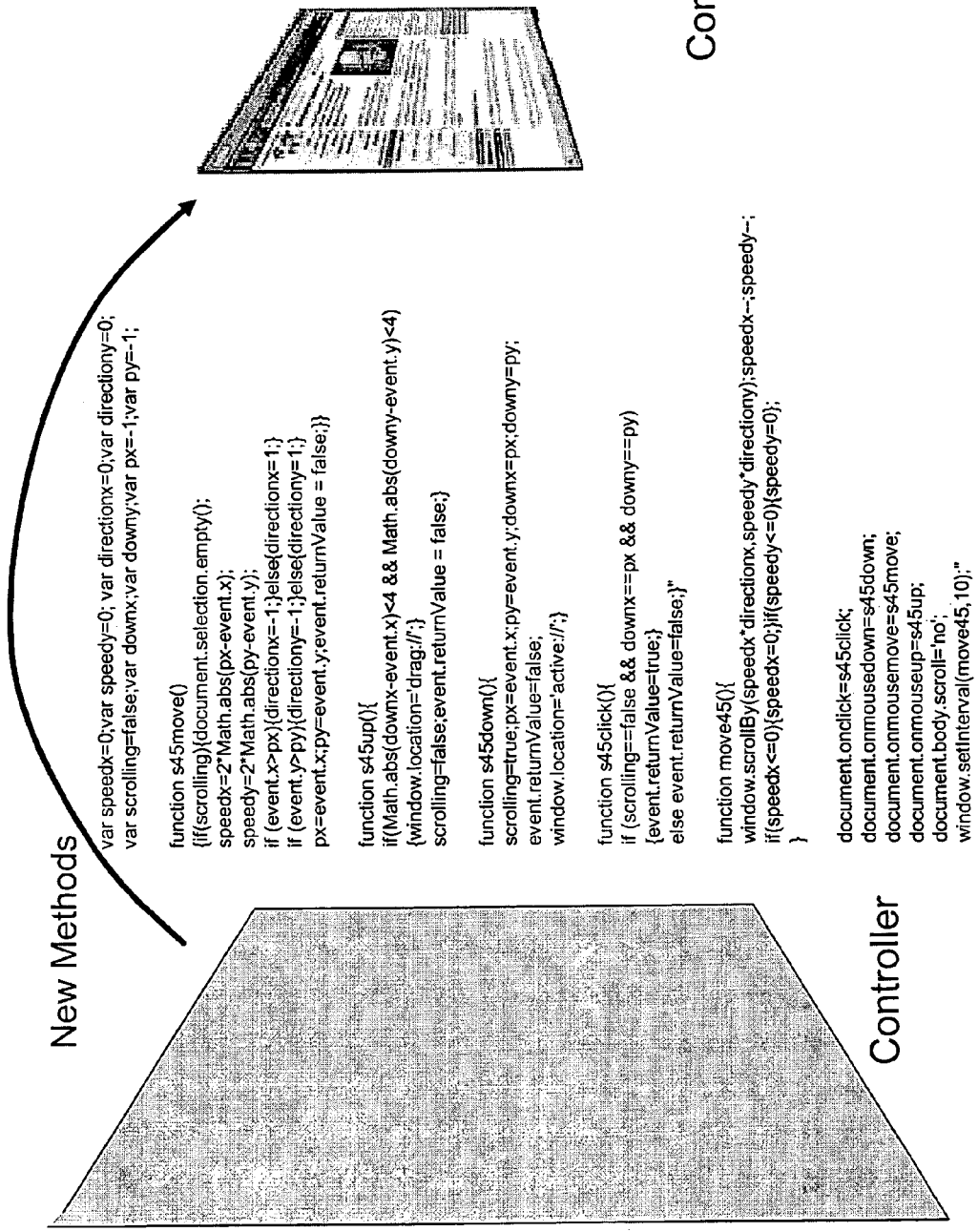

FIG. 4 shows how in an exemplary embodiment, a Controller component is injecting new codes into a Content component that redefines how scrolling actions. In this example, input processing for events to displayed Web content is being overridden with new processing wherein instead of showing scrollbars on the Web page and manipulating those, scroll bars are removed and mouse events directly on the Web content trigger the scrolling action, except where such events trigger other actions such as following a hyperlink in the Web content. In this way, many other changes of appearance, behavior, and content may be made.

Figure 5:
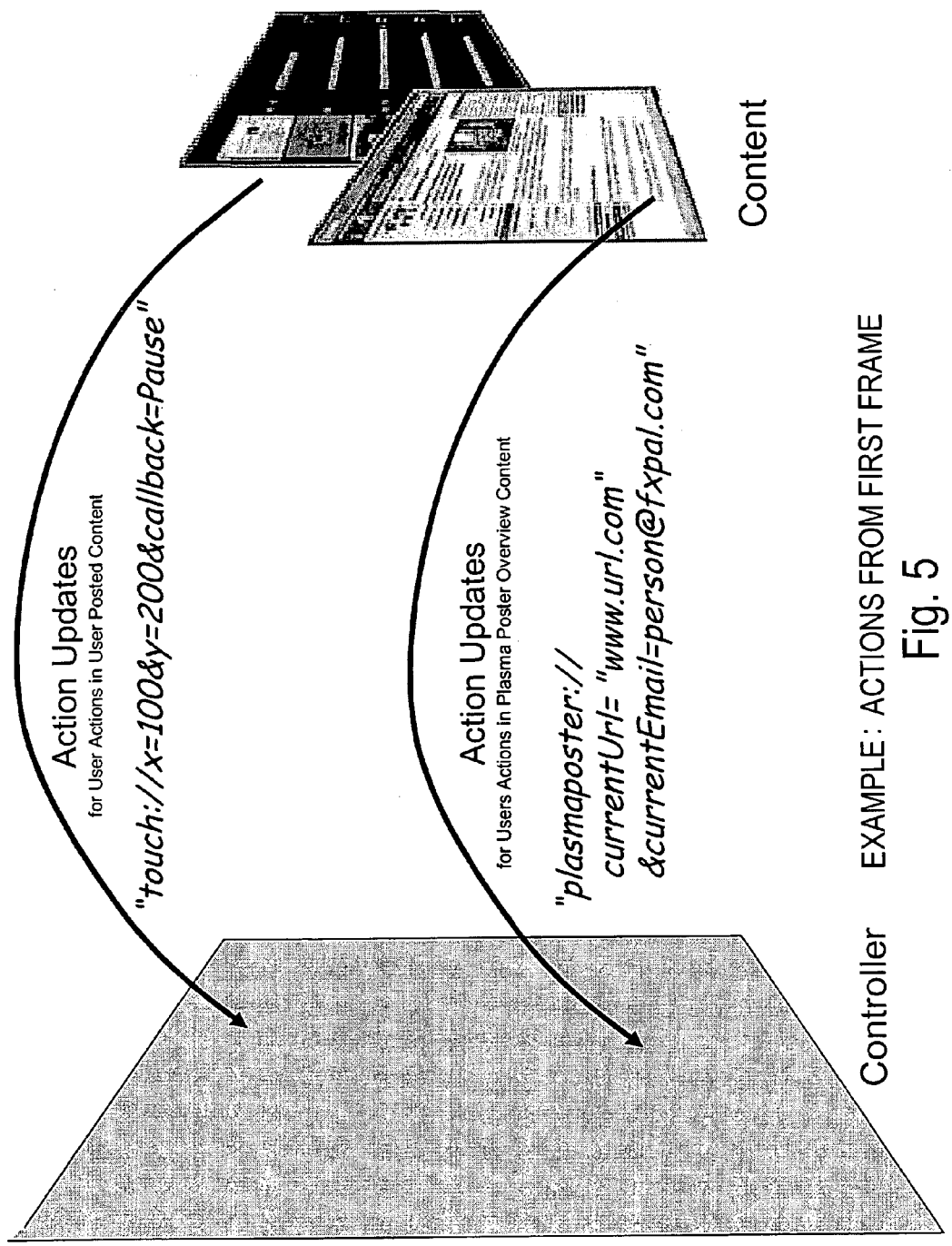
Figure 6:
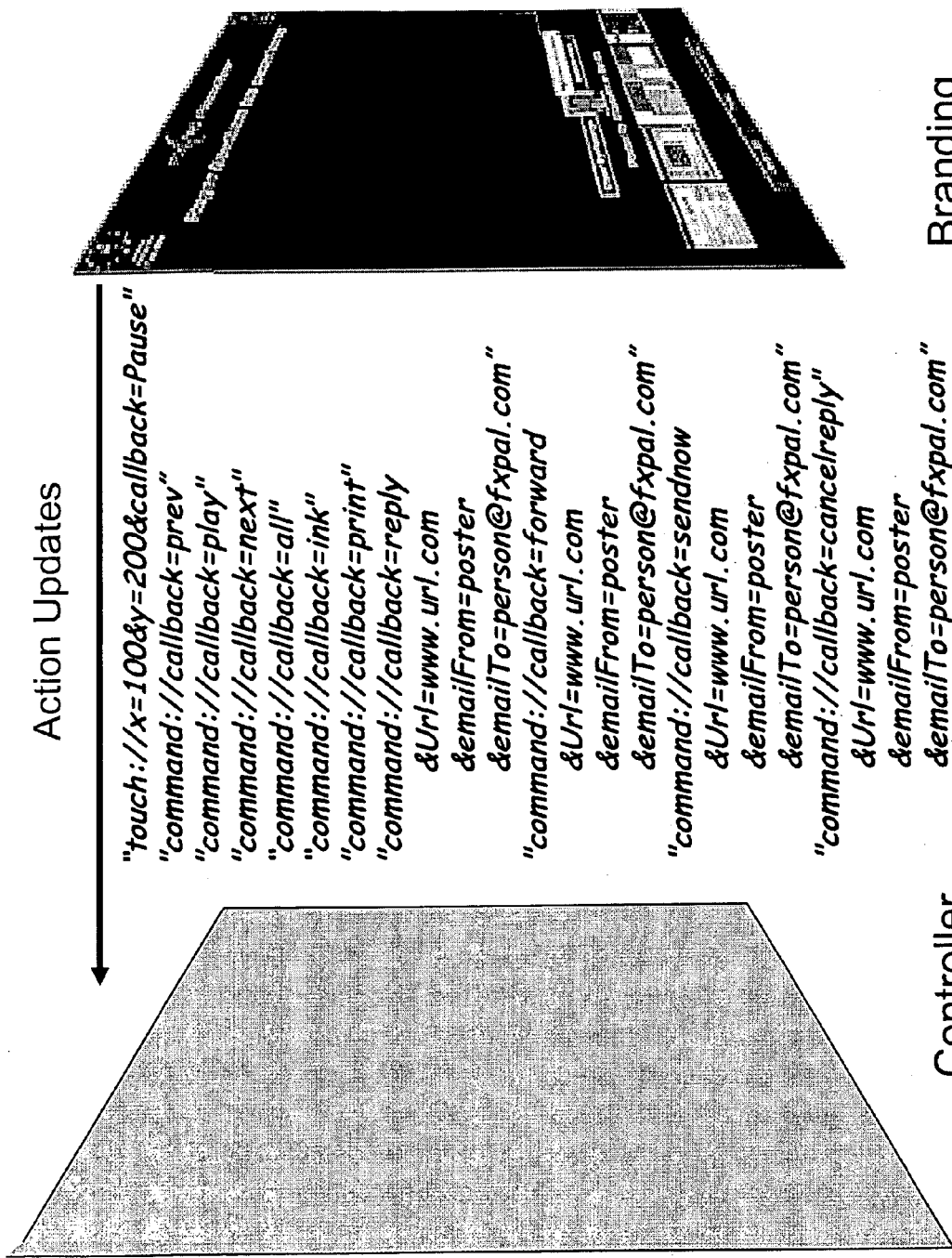

FIG. 5, shows how in an exemplary embodiment, a Content component has been augmented to communicate a state to a Controller component. In this example, Web content has been augmented in such a way that when a touch event occurs within the content such as through a mouse input event, a message is communicated to the controller using a protocol defined for the purposes of repurposing the user interface of the displayed content. In this example, the protocol consists of a keyword indicating a repurposing event to be communicated, namely that a 'Touch' has occurred. Information about the touch event is further specified in the message, namely the X and Y coordinates of the touch in the coordinate frame of the Content. Lastly, a callback procedure within another component, in this case the Branding component, is communicated to request a Pause action to occur in the processing of the Branding component. Also shown in FIG. 5, a second action update is illustrated where a repurposing event to be communicated, namely that a 'PlasmaPoster' event has occurred indicating that within a Web page, an application specific hyperlink event has occurred. The Web address to be linked to is given along with an email address of a person who has been associated with that Web address. In this way, many other specifications of processing may occur with respect to repurposing events accepted in one component and invoking new processing in one or more possibly different components, as shown in FIG. 6.

Figure 7:
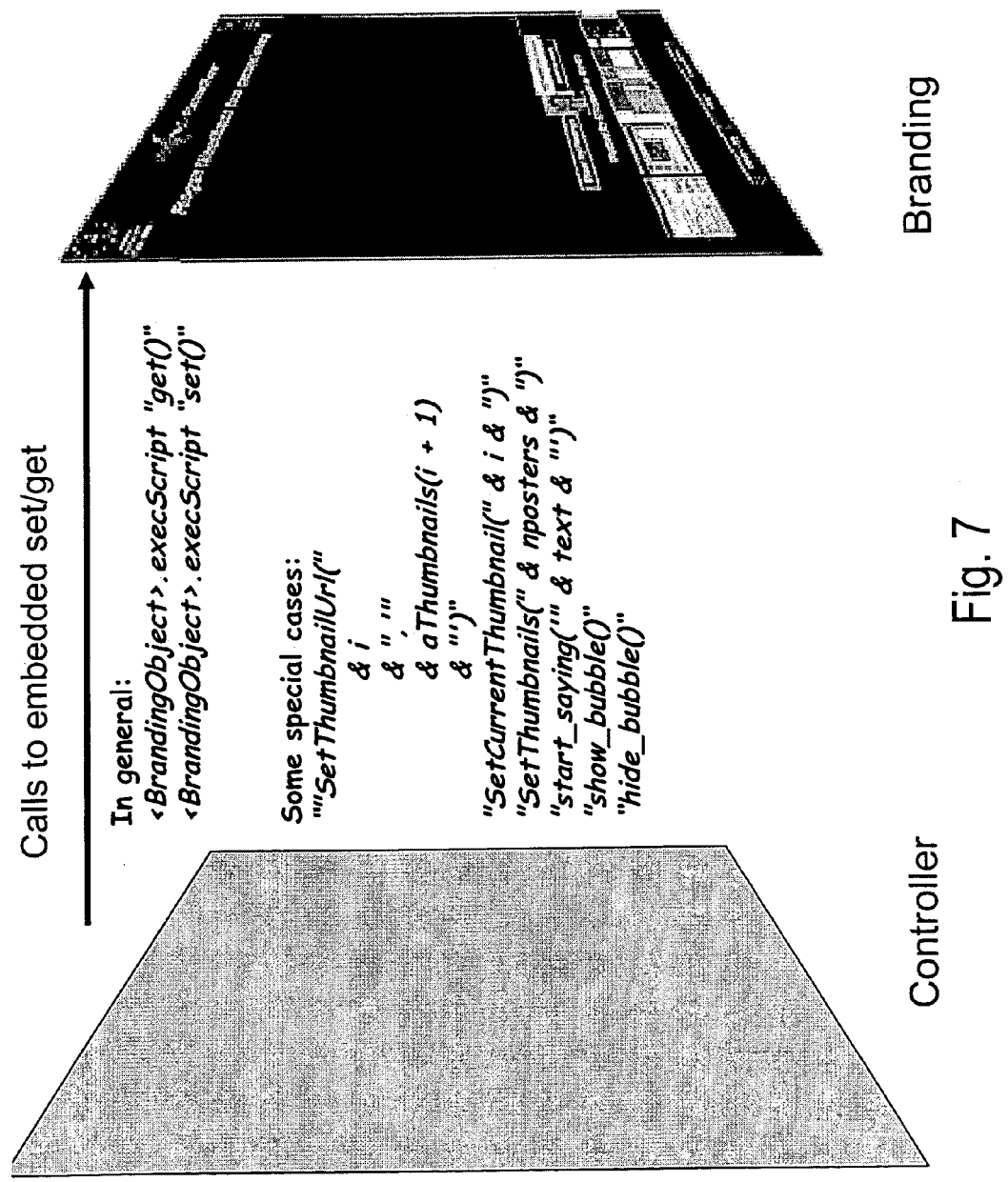

FIG. 7 shows how in an exemplary embodiment on component calls code embedded or injected into another component. In this example, code for setting and retrieving state in the Branding component is accessed from the Controller component.

Figure 8:
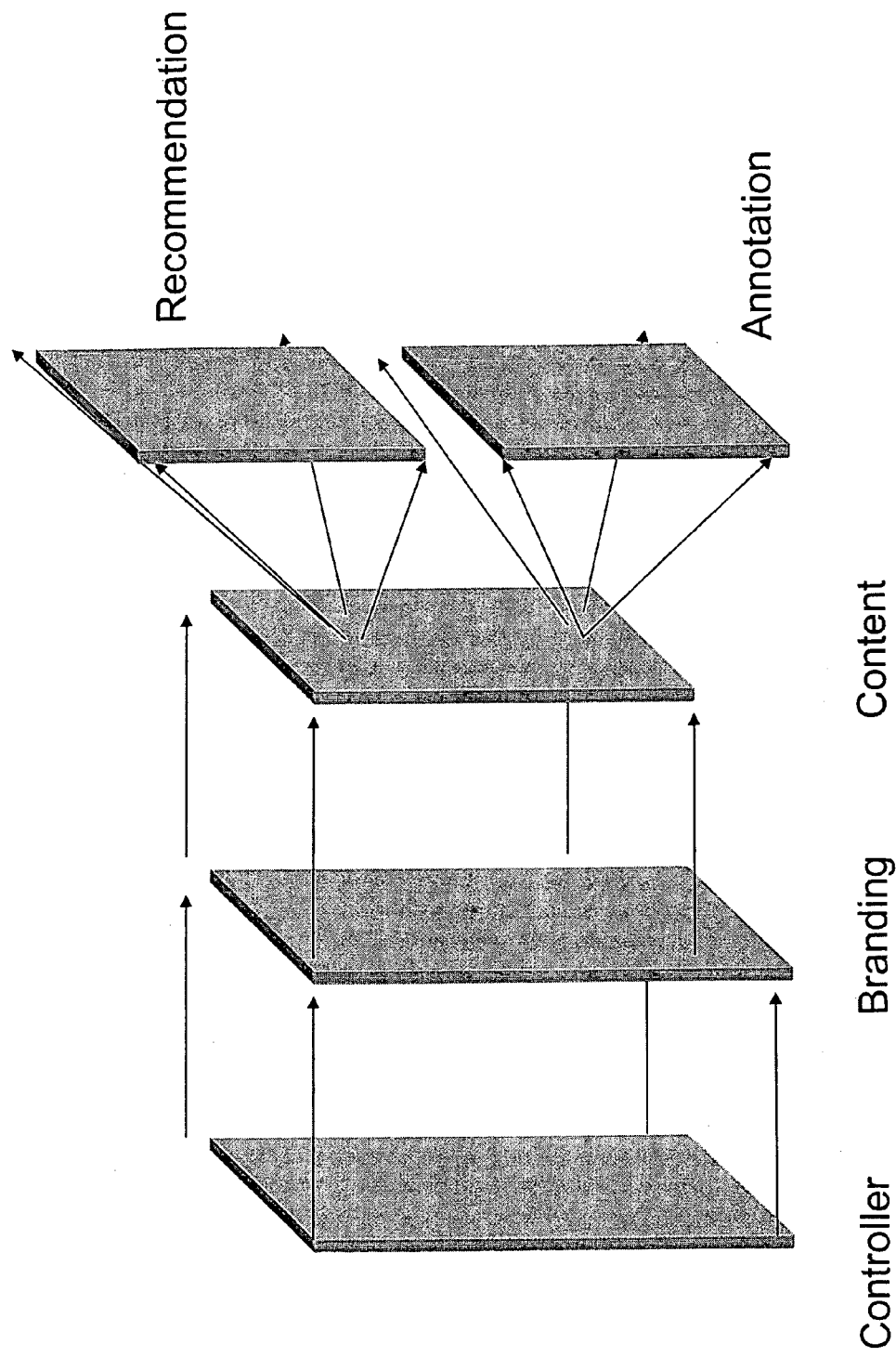
FIG. 8 is a high-level schematic representation of an alternative exemplary embodiment of a method and system for restructuring a user interface component of a computer application according to this invention.

FIG. 8 is a high-level schematic representation of an alternative exemplary embodiment of a method and system for restructuring a user interface component of a computer application according to this invention. In addition to the Content, Controller, and Branding components described here, other components may be restructured in this manner to facilitate user interface repurposing. These include, but are not limited to, approaches for supporting annotations over content, and applying techniques for analyzing content and making recommendations about alternative related content.

Figure 9:
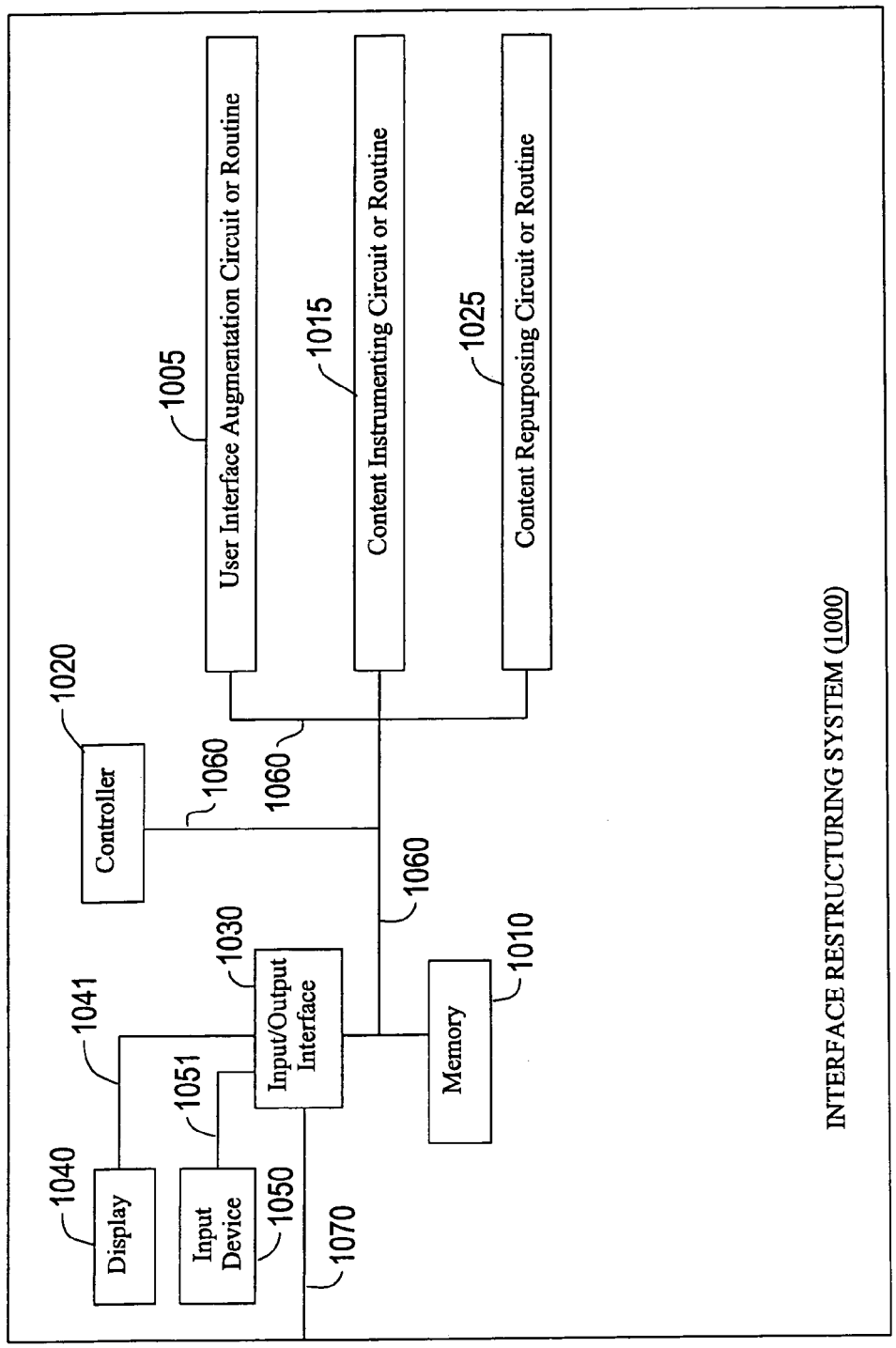
FIG. 9 is a functional block diagram of one exemplary embodiment of a system for restructuring a user interface component of a computer application according to this invention.

FIG. 9 is a functional block diagram of one exemplary embodiment of a system 1000 for restructuring a user interface component of a computer application according to this invention. The system 1000 includes an exterior data connection 1070. In various exemplary embodiments, data connection 1070 is any known or later developed device or system for connecting the system 1000 to the exterior, such as, for example, to a network (not shown), including a connection over public switched telephone network, a direct cable connection, a connection over a wide area network, a local area network or a storage area network, a connection over an intranet or an extranet, a connection over the Internet, or a connection over any other distributed processing network or system. In general, data connection 1070 is any known or later-developed connection system or structure usable to connect the system 1000 to the exterior, such as, for example, to a network.

As shown in FIG. 9, the system 1000 includes one or more display devices 1040 usable to display information to a user, and one or more user input devices 1050 usable to allow the user or users to input data into the system 1000. The one or more display devices 1040 and the one or more input devices 1050 are connected to the system 1000 through an input/output interface 1030 via one or more communication links 1041 and 1051, respectively. The one or more communication links 1041 and 1051 are generally similar to the data connection 1070 above.

In various exemplary embodiments, the system 1000 includes at least one or more of a controller 1020, a memory 1010, a user interface augmentation circuit or routine 1005, a content instrumenting circuit or routine 1015, and a content repurposing circuit or routine 1025, all of which are interconnected over one or more data and/or control buses and/or application programming interfaces 1060.

In various exemplary embodiments, the controller 1020 controls the operation of the other components of the system 1000. In various exemplary embodiments, the controller 1020 also controls the flow of data between various components of the system 1000 as needed. In various exemplary embodiments, the memory 1010 stores information coming into or going out of the system 1000. In various exemplary embodiments, the memory 1010 stores any necessary programs and/or data implementing the functions of the system 1000, and/or stores data, such as, for example, data, actions, events required for restructuring a user interface component of a computer application.

In various exemplary embodiments, the memory 1010 is implemented using any appropriate combination of alterable, volatile or non-volatile memory or non-alterable, or fixed, memory. In various exemplary embodiments, the alterable memory, whether volatile or non-volatile, is implemented using any one or more of static or dynamic RAM, a floppy disk and disk drive, a writable or re-rewriteable optical disk and disk drive, a hard drive, flash memory or the like. Similarly, in various exemplary embodiments, the non-alterable or fixed memory is implemented using any one or more of ROM, PROM, EPROM, EEPROM, an optical ROM disk, such as a CD-ROM or DVD-ROM disk, and disk drive or the like.

In various exemplary embodiments, the controller performs various functions, selected from a list including, but not limited to, augmenting one or more existing user interface components, instrumenting content viewed in one or more existing user interface components, creating one or more multi-directionally communicating processes between multiple existing user interface components, and other like functions. In creating multi-directionally communications between existing user interface components, the controller is able to define and redefine what behaviors, appearances, and content are being processed in and between any of the interface components of the system. This includes but is not limited to repurposing input event processing, showing different styles, modifying content, communicating state to other systems, and accepting state from other systems and distributing that to interface components with the repurposed system.

This invention has been described in conjunction with the exemplary embodiments outlined above. Various alternatives, modifications, variations, and/or improvements are within the spirit and scope of the invention, whether known or presently unforeseen. Accordingly, the exemplary embodiments of the invention, as set forth above, are intended to be illustrative, not limiting. Various changes may be made without departing from the spirit and scope of the invention. Therefore, the invention is intended to embrace all known or later developed alternatives, modifications, variations and/or improvements.

What is claimed is:

1. A method of restructuring a user interface component of a first computer application, the method comprising:
   providing a second computer application;
   the second computer application dynamically injecting a functionality into a first layer in the user interface component of the first computer application;
   the second computer application communicating an event to a controlling process used in at least the first layer; and
   performing an action in the first layer based on the communicated event,
   wherein the second computer application uses the injecting and communicating to control operation of the first computer application, and
   wherein multi-directionally communicating processes are created by the second computer application by inserting application level repurposing communication protocols into the user interface component of the first computer application;
   wherein the repurposing communication protocols override communication protocols of the user interface component of a first computer application, thereby enabling the second computer application to perform an action in the first layer based on the communicated event through the repurposing communication protocols.

2. The method according to claim 1, the controlling process restructuring at least one of an appearance, a functionality and a condition of at least the first layer.

3. The method according to claim 2, further comprising indicating to a second layer, a change of the condition of the at least the first layer.

4. The method according to claim 3, wherein said indicating is performed in an automated manner.

5. The method according to claim 3, wherein the second layer comprises a branding layer.

6. The method according to claim 3, wherein an action is performed in the second layer in response to the change of the condition of the at least the first layer.

7. The method according to claim 6, wherein the action performed in the second layer is the same as the action performed in the first layer.

8. The method according to claim 1, wherein the first layer comprises a content layer.

9. The method according to claim 1, wherein said communicating is performed in an automated manner.

10. A system for displaying information including a plurality of layers on a display, comprising:
  a display for displaying information;
  a first layer application receiving first document data and rendering a first layer of the plurality of layers based on first information, the first layer data comprising at least one user interface component codes, the first layer application rendering the first layer including a user interface component corresponding to the at least one user interface component codes and a first user action data being generated by the user's action to the user interface component;
  a second layer application receiving second layer data, the second layer application rendering a second layer of the plurality of layers based on second information;
  a controller communicating with the first layer application and the second layer application;
  the controller dynamically generating the first layer by expanding or augmenting original layer data using a first protocol, the first layer application rendering an original layer including one or more existing user interface components of the original layer data using a first protocol, the first protocol differing from a second protocol by which the second layer application renders the second layer,
  wherein the controller sending the first layer data to the first layer application;
  wherein the controller receives the first user action data;
  wherein the controller performs an action based on the user data; and
  wherein the controller transmits the second layer data to the second layer application, the second layer data being generated based on the action;
  wherein the expanding or the augmenting of the original layer data further comprises:
  at least one of adding, removing, or modifying the code of the at least one user interface component codes;
  at least one of adding, removing, or modifying components of a content displayed in the one or more existing user interface components,
  manipulating within the one or more existing user interface components of one or more of at least a scripting language, a macro, a parameter and a configuration information,
  at least one of:
    adding or modifying communication of events occurring within a first layer of the one or more existing user interface components to the second layer,
    redefinition of existing data structures within the first layer,
    incorporation of new data structures within the first layer,
    removal of data structures within the first layer,
    redefinition of existing functionality within the first layer,
    incorporation of new functionality within the first layer, and
    removal of functionality within the first layer,
  wherein the first and second layer applications are document browsers and the first and second layers are overlapped on the display.

11. The system of claim 10, wherein the second layer data further comprises at least one of second user interface component codes, the second layer application further comprises a user interface component corresponding to the at least one of the second user interface component codes and a second user action data being generated by the user's action to the second user interface component, and the controller generates the first layer data based on the second user action data, and wherein the controller facilitates multi-directionally communication between the first and the second layer application.

12. A method for displaying information by utilizing a plurality of layers on a display, comprising:
  receiving first layer data;
  utilizing a first layer application to render a first layer of the plurality of layers based on first information, the first layer data comprising at least one user interface component codes, the first layer application rendering the first layer including a user interface component corresponding to the at least one user interface component codes and a first user action data being generated by the user's action to the user interface component;
  receiving second layer data;
  utilizing a second layer application to render a second layer of the plurality of layers based on second information;
  communicating with the first layer application and the second layer application through a controller;
  dynamically generating the first layer by expanding or augmenting original layer data using a first protocol,
  utilizing the first layer application to render an original layer including one or more existing user interface components of the original layer data using a first protocol, the first protocol differing from a second protocol by which the second layer application renders the second layer,
  sending the first layer data to the first layer application via the controller;
  receiving the first user action data via the controller;
  performing an action based on the user data via the controller; and
  transmitting the second layer data to the second layer application via the controller, the second layer data being generated based on the action
wherein the expanding or the augmenting of the original layer data further comprises:
  at least one of adding, removing, or modifying the code of the at least one user interface component codes;
  at least one of adding, removing, or modifying components of a content displayed in the one or more existing user interface components,
  manipulating within the one or more existing user interface components of one or more of at least a scripting language, a macro, a parameter and a configuration information,
  at least one of:
    adding or modifying communication of events occurring within a first layer of the one or more existing user interface components to the second layer,
    redefinition of existing data structures within the first layer,
    incorporation of new data structures within the first layer, removal of data structures within the first layer,
redefinition of existing functionality within the first layer,
incorporation of new functionality within the first layer, and
removal of functionality within the first layer;

wherein the first and second layer applications are document browsers and the first and second layers are overlapped on the display.

13. The method of claim 12, wherein the second layer data further comprises at least one of second user interface component codes, the second layer application further comprises a user interface component corresponding to the at least one of the second user interface component codes and a second user action data being generated by the user's action to the second user interface component, and further comprising:

generating the first layer data based on the second user action data;

facilitating multi-directionally communication between the first and the second layer application.

\* \* \* \* \*